United States Patent
Anderson et al.

(10) Patent No.: US 8,141,160 B2
(45) Date of Patent: Mar. 20, 2012

(54) MITIGATING AND MANAGING PRIVACY RISKS USING PLANNING

(75) Inventors: Kay S. Anderson, Washington, DC (US); Alexandre V. Evfimievski, San Jose, CA (US); Mark D. Feblowitz, Winchester, MA (US); Genady Grabarnik, Scarsdale, NY (US); Nagui Halim, Yorktown Heights, NY (US); Zhen Liu, Tarrytown, NY (US); Ralf Rantzau, San Jose, CA (US); Anton V. Riabov, Ossining, NY (US); Angela Schuett, Columbia, MD (US); Ramakrishnan Srikant, San Jose, CA (US); Grant Wagner, Columbia, MD (US)

(73) Assignee: International Business Machines Corporation, Armonk, NY (US)

( * ) Notice: Subject to any disclaimer, the term of this patent is extended or adjusted under 35 U.S.C. 154(b) by 1354 days.

(21) Appl. No.: 11/493,321

(22) Filed: Jul. 26, 2006

(65) Prior Publication Data

US 2010/0242120 A1    Sep. 23, 2010

(51) Int. Cl.
    *H04L 29/06* (2006.01)
(52) U.S. Cl. .............. 726/26; 709/223; 705/1
(58) Field of Classification Search .......... 726/1, 26; 705/1; 709/223
    See application file for complete search history.

(56) References Cited

U.S. PATENT DOCUMENTS

| | | | |
|---|---|---|---|
| 2002/0087878 A1* | 7/2002 | Ballen et al. | 726/1 |
| 2003/0200468 A1* | 10/2003 | Raley et al. | 726/26 |
| 2004/0098285 A1* | 5/2004 | Breslin et al. | 705/1 |
| 2006/0123461 A1* | 6/2006 | Lunt et al. | 726/1 |
| 2007/0162976 A1 | 7/2007 | Anderson et al. | |
| 2007/0204020 A1 | 8/2007 | Anderson et al. | |

OTHER PUBLICATIONS

Woodruff & Stonebraker, Supporting Fine-Grained Data Lineage in a Database Visualization Environment, 1-Computer Science Division (EECS), 2-Univ. of Ca., Proc. of the 13th International Conference on Data Engineering, Jan. 1997, pp. 1-12, Report No. UCB/CSD-97-932, Berkeley, CA.

Keller, Hellerstein, Wolf, Wu, Krishnan, Brown, The CHAMPS System: A Schedule-optimized Change Manager,USENIX'04 Annual Technical Conference, Advanced SysAdmin SIG, Jun. 28, 2004,IBM T.J. Watson Research Center, Boston, MA.

Hachem, Qiu, Gennert, Ward, Managing Derived Data in the Gaea Scientific DBMS*,1993, pp. 1-12, Aug. 1993, Proceedings of the 19th VLDB Conference, Dublin, Ireland.

Ferraiolo & Kuhn, Role-Based Access Control, Oct. 1992, pp. 1-11, Proceedings of the 15th NIST-NSA National Computer Security Conference, Baltimore, Md.

(Continued)

*Primary Examiner* — Vivek Srivastava
*Assistant Examiner* — Thong Truong
(74) *Attorney, Agent, or Firm* — Stephen Bongini; Fleit Gibbons Gutman Bongini & Bianco PL

(57) ABSTRACT

System and methods are provided for managing and mitigating privacy risks in a system having a network of processing elements. According to one method, there is receive a request for at least one output product from the system. The request includes a set of privacy parameters. At least one set of workflow generating strategies are created that results in the output product having a privacy risk value below a predefined threshold. At least one of the workflow generating strategies is deployed for automatically producing the at least one output product.

20 Claims, 6 Drawing Sheets

OTHER PUBLICATIONS

Doshi, Goodwin, Akkiraju & Verma, Dynamic: Workflow Composition using Markov Decision Processes, Proceedings of IEEE Second International Coference on Web Services,International Journal of Web Services Research, 2(1), Jun. 2004, 27 pgs.

Cui, Widom & Wiener, Tracing the Lineage of View Data in a Warehousing Environment, ACM Transactions on Database Systems (TODS), vol. 25, Issue 2, Jun. 2000, pp. 179-227, Stanford, CA.

Botha & Eloff, A framework for access control in workflow systems, MCB University Press [ISSN 0968-5227], Information Management & Computer Security 9 (3), 2001, pp. 126-133. Port Elizabeth & Johannesburg, South Africa.

Botha & Eloff, Separation of duties for access control enforcement in workflow environments, IBM Systems Journal, vol. 40, Issue 3, pp. 666-682, Mar. 2001, Port Elizabeth & Johannesburg, S. Africa.

Blythe, Deelman, Gil, Kesselman, Agarwal, Menta & Vahi, The Role of Planning in Grid Computing, Copyright 2002, ICAPS 2003, American Association for Artificial Intelligence, Marina del Rey, CA.

Bertino, Ferrari & Mella, An XML-Based Approach to Document Flow Verification, K., Zhang & Y. Zheng (Eds.)In Proceedings of the 7th International Information Security Conference (ISC 2004), Sep. 27-29, 2004, Lecture Notes in Computer Schience, vol. 3225, 2004, pp. 207-218,Palo Alto, CA.

Bell & La Padula, Secure Computer System: Unified Exposition and Multics Interpretation, Mar. 1976, 134 pgs. project No. 522B, contract No. F19628-76-C-0001, The MITRE Corp., Bedford, MA.

Hoffmann, The Metric-FF Planning System: Translating 'Ignoring Delete Lists' to Numeric State Variables, Journal of AI Research, 2003, vol. 20, pp. 291-341.

Ghallab, et al., PDDL. The planning domain definition language Yale Center for Computational Vision & Control, 1998, DCS TR-1165.

Srivastava, B, "A Decision Support Framework for Component Reuse and Maintaince in Software Project Management," IEEE $8^{th}$ European Conference of Software Maintainence and Engineering (CSMR 2004). 2004. Tampere, Finland.

Riabov, A, et al. "Planning for Stream Processing Systems," In the Twentieth National Conference on Artificial Intelligence, AAAI, 2005.

Anonymous Author, "Multilevel Security in the Department of Defense: The Basics," National Security Institute, Mar. 2005.

\* cited by examiner

MITIGATING AND MANAGING PRIVACY RISKS USING PLANNING

STATEMENT REGARDING FEDERALLY SPONSORED RESEARCH OR DEVELOPMENT

This invention was made with Government support under Contract No.: H98230-04-3-0001 awarded by U.S. Dept. of Defense. The Government has certain rights in this invention.

FIELD OF THE INVENTION

The present invention generally relates to the field of privacy protection, and more particularly relates to mitigating and managing privacy risks through planning techniques.

BACKGROUND OF THE INVENTION

Many businesses and government organizations face the need to collect, store, and process personally identifiable information ("PII") such as personal information associated with employees, customers, or in the case of a government, their citizens. Privacy protection laws and common business practices require these organizations to develop and adhere to a privacy policy that governs the use of PII. In particular, a privacy policy establishes the purposes for which personal information can be used within the organization, and under which conditions it may be accessed by the organization's employees or by other organizations.

Furthermore, many businesses and organizations use information processing systems that can be modeled as networks of interconnected processing elements. In general, a network of processing elements accepts certain entities through input channels, which are referred to as primal sources within the network. Processing elements may accept entities via one or more input channels, and may modify received entities or produce new entities and release one or more entities via one or more output channels. Exemplary processing elements may include businesses, manned workstations, factory machinery, software programs, agents, services, components, and the like. Exemplary primal entities may include, but are not limited to, business documents, machine parts, news feeds, data obtained from computer networks, and the like. The entities may include private information such as employee information, trade secrets, other confidential information, and the like. Therefore, disclosure of private information is a concern when using networks of processing elements.

FIG. 1 represents a typical processing graph 100 illustrating the interconnection between processing elements in a network of processing elements. Entities enter the network system through primal sources 102, 104, and 106.

The input entities, which can include private information, can be documents that come from various sources, including databases, archives, or sensory inputs. Entities produced by processing elements within the network can also be used as input data for other elements. The entities can then be processed by one of processing elements such as processing elements PE A 108, PE B 110, and PE C 112. The entities can also be directly presented to other parties through an output channel 114 and 116. Entities that were processed by one of the processing elements 108, 110, or 112, can be similarly processed again by other processing elements, or submitted to one of the output channels 114 and 116. At any point in time, the data can be stored within the network of processing elements.

Although information processing systems based on networks of processing elements are very useful for processing data, privacy risks exist when private information is being used in a workflow. Users, organizations, and the components of the business process itself are being trusted with private information. All of the participants of the business process are usually required to adhere to a privacy policy, non-disclosure agreements, and the like. However, the participants often have the potential to violate these policies and agreements regulating the use of PII. If an information processing system does not implement privacy control, unauthorized access to private information can occur. For example, a user requesting a specific data product to be produced by the information processing system may not be authorized to view the resulting data. Also, one or more of the processing elements may not be authorized to accept specific data as an input.

Existing compositional systems based on networks of processing elements use planning techniques to mitigate and manage security risks. Planning techniques allow for automatically creating workflows of processing elements according to product requirements. Planning techniques are useful in applications related to semantic web, web services, workflow composition, and component-based software where manual analysis is inefficient. However, current compositional systems implementing planning techniques do not consider privacy control in the planning. Examples of planning systems are further described in A. Keller, "*The CHAMPS System: A Schedule-optimized Change Manager*", *USENIX'04 Ann. Technical Conf.*, June 2004; J. Blythe, et al., "*The Role of Planning in Grid Computing*", *ICAPS* 2003; P. Doshi, et al., "*Dynamic Workflow Composition using Markov Decision Processes*", *Proceedings of IEEE Second International Conference on Web Services*, June, 2004; and B. Srivastava "*A Decision-support Framework for Component Reuse and Maintenance in Software Project Management*", *CSMR '04*, which are hereby incorporated herein by reference in their entirety.

Although there are similarities between information security and privacy protection, privacy risks are different from security risks. While security is mainly concerned with access control at a coarse granularity of data, privacy controls are more fine-grain. For example, security access control policies used for securing information flows, Such as Mandatory Access Control ("MAC"), Multi-Level Secure systems ("MLS"), and Role-Based Access Control ("RBAC"), typically evaluate the risk of large pieces of information, such as entire documents or a database table. In many instances, a security access control policy allows certain privacy-sensitive data, such as level of income or medical history to be published and used for research. In other words, planning systems that mitigate security risks do not take privacy risks into consideration. A few examples of security access control models are further described in the following references: D. Bell, et al., "*Computer security model: Unified exposition and Multics interpretation*", Technical Report ESD-TR-75-306, The MITRE Corporation, Bedford, Mass., HQ Electronic Systems Division, Hanscom AFB, MA, June 1975 and D. Ferraiolo, et al., "*Role Based Access Control*", *Proceedings of the 15-th NIST-NSA National Computer Security Conference, Baltimore, Md.*, 13-16 Oct. 1992, which are hereby incorporated herein by reference in their entirety.

Further description on workflow security can be found in the following references E. Bertino, et al., "*An XML-Based Approach to Document Flow Verification*", In Proc. of the 7-th International Information Security Conference (ISC 2004), Palo Alto, Calif., USA, Sep. 27-29, 2004, *Lecture Notes in Computer Science*, Volume 3225, 2004, pp. 207-218;

R. Botha, et al., "Separation of duties for access control enforcement in workflow environments", IBM Systems Journal, Volume 40, Issue 3 (March 2001), Pages: 666-682; R. Botha, et al., "A framework for access control in workflow systems", Information Management and Computer Security 9 (3), 2001, and the commonly owned U.S. patent application Ser. No. 11/328,589, filed Jan. 10, 2006, entitled "Method of Managing and Mitigating Security Risks Through Planning", which are hereby incorporated herein by reference in their entirety.

In contrast, privacy protection policies are focused on disclosure risks associated with releasing personally identifiable information. Privacy protection policies may restrict access to certain records within a database table, or certain fields in a document. For example, a privacy protection policy may state that personal information about minors should not be accessed for a given purpose. Further, privacy protection policies may place restrictions on filtering and combining data. For example, combining bank account number with social security number within one document can generate a high privacy risk.

Current workflow systems do not include an automatic mechanism for preserving privacy. Typically, human experts are used to ensure that privacy risks do not exceed acceptable levels. However, in large workflow systems, using a human to compose the workflows and manage privacy risks is very difficult and inefficient. In addition to privacy concerns, other criteria, such as output quality and resource utilization must be considered in workflow composition, which makes the composition even more difficult.

Composing workflows is a labor-intensive task, which requires that the person building the workflow has an extensive knowledge of component functionality and compatibility. In many cases this makes it necessary for end-users of these systems to contact system or component developers each time a new output information stream is requested, and a new configuration is needed. This process is costly, error-prone, and time-consuming.

Additionally, in large practical systems both changes in the input supplied to the system and changes in the system configuration (availability of processing units, primal streams, and the like) can invalidate deployed and running workflows. With time, these applications can start producing output that no longer satisfies output requirements. In particular, the original estimate of privacy risk can become invalid. Timely reconfiguration of workflows to account for these changes is extremely hard to achieve if the workflow composition requires human involvement.

SUMMARY OF THE INVENTION

Briefly, in accordance with embodiments of the present invention, disclosed are a system, method, and computer readable medium for managing and mitigating privacy risks in a system having a network of processing elements. According to the method of one embodiment, there is received a request for at least one output product from the system. The request includes a set of privacy parameters. At least one set of workflow generating strategies are created that results in the output product having a privacy risk value below a predefined threshold. At least one of the workflow generating strategies is deployed for automatically producing the at least one output product.

In another embodiment, a system is provided for system for managing and mitigating privacy risks. The system includes a memory and a processor communicatively coupled to the memory. The system also includes a receiver for receiving a request for at least one output product from the system. The request including a set of privacy parameters. A workflow planner is also included in the system for creating at least one set of workflow generating strategies that results in the output product having a privacy risk value below a predefined threshold. A workflow deployer deploys at least one of the workflow generating strategies for automatically producing the at least one output product.

In yet another embodiment, a computer readable medium is provided for managing and mitigating privacy risks in a system comprising a network of processing elements. The computer readable medium comprises instructions for receiving a request for at least one output product from the system. The request includes a set of privacy parameters. At least one set of workflow generating strategies are created that results in the output product having a privacy risk value below a predefined threshold. At least one of the workflow generating strategies is deployed for automatically producing the at least one output product.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

Exemplary Stream Processing System

Figure 1:
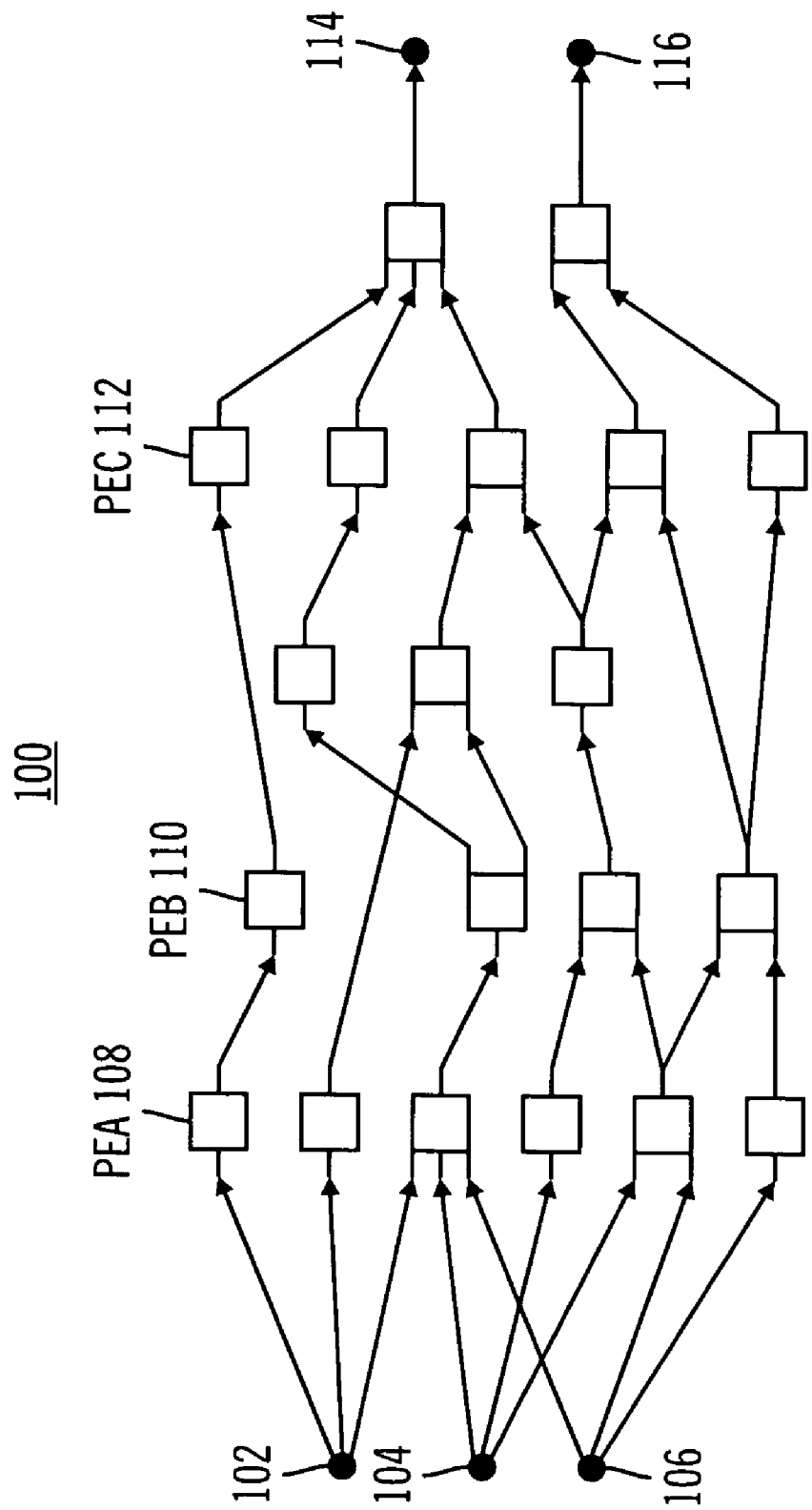
FIG. 1 is a processing graph illustrating the interconnections between processing elements in a stream processing system.
Figure 2:
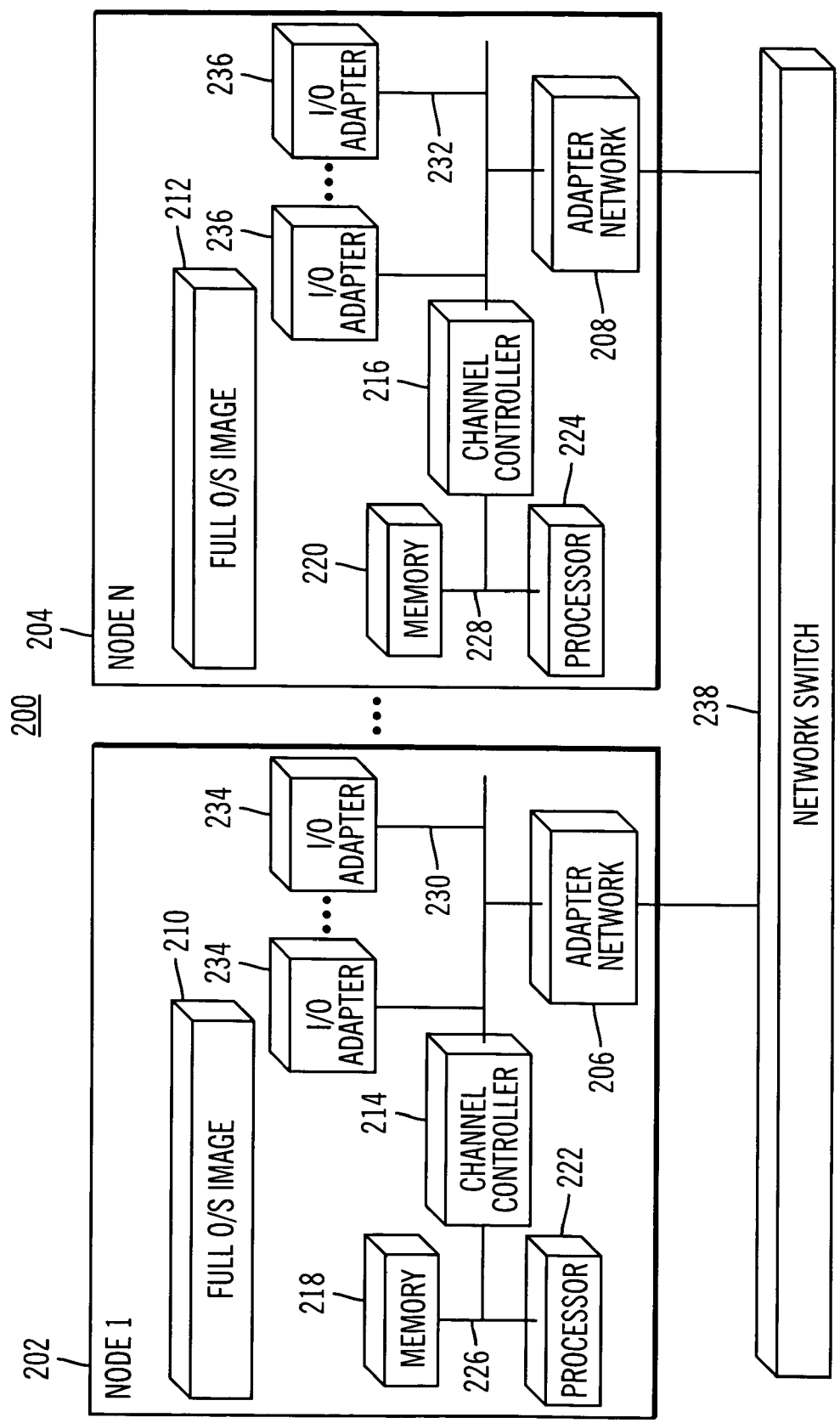
FIG. 2 is a block diagram of a distributed stream processing system according to an embodiment of the present invention.

FIG. 2 shows a stream processing system according to one embodiment of the present invention. The stream processing system, in this embodiment, is an information processing system based on a network of processing elements, where processing elements are software programs and where the entities that are processed by the processing elements comprise data objects (for example, documents represented in digital form). However, the present invention is not limited to a stream processing system. For example, the present invention is also applicable to grid computing systems, web service systems, and other distributed computer systems where planning can be used for workflow composition or alteration.

In the illustrated embodiment, the stream processing system 200 is a distributed stream processing system in a symmetric multiprocessing ("SMP") computing environment.

The stream processing system 200 includes processing nodes 202 and 204 coupled to one another via network adapters 206 and 208. Each processing node 202 and 204 is an independent computer with its own operating system image 210 and 212, channel controller 214 and 216, memory 218 and 220, and processor(s) 222 and 224 on a system memory bus 226 and 228. A system input/output bus 220 and 222 couples I/O adapters 234 and 236 and network adapter 206 and 208. Although only one processor 222 and 224 is shown in each processing node 202 and 204, each processing node 202 and 204 is capable of having more than one processor. Each network adapter is linked together via a network switch 228. In some embodiments, the various processing nodes 102 and 104 are part of a processing cluster.

Exemplary Information Processing System

Figure 3:
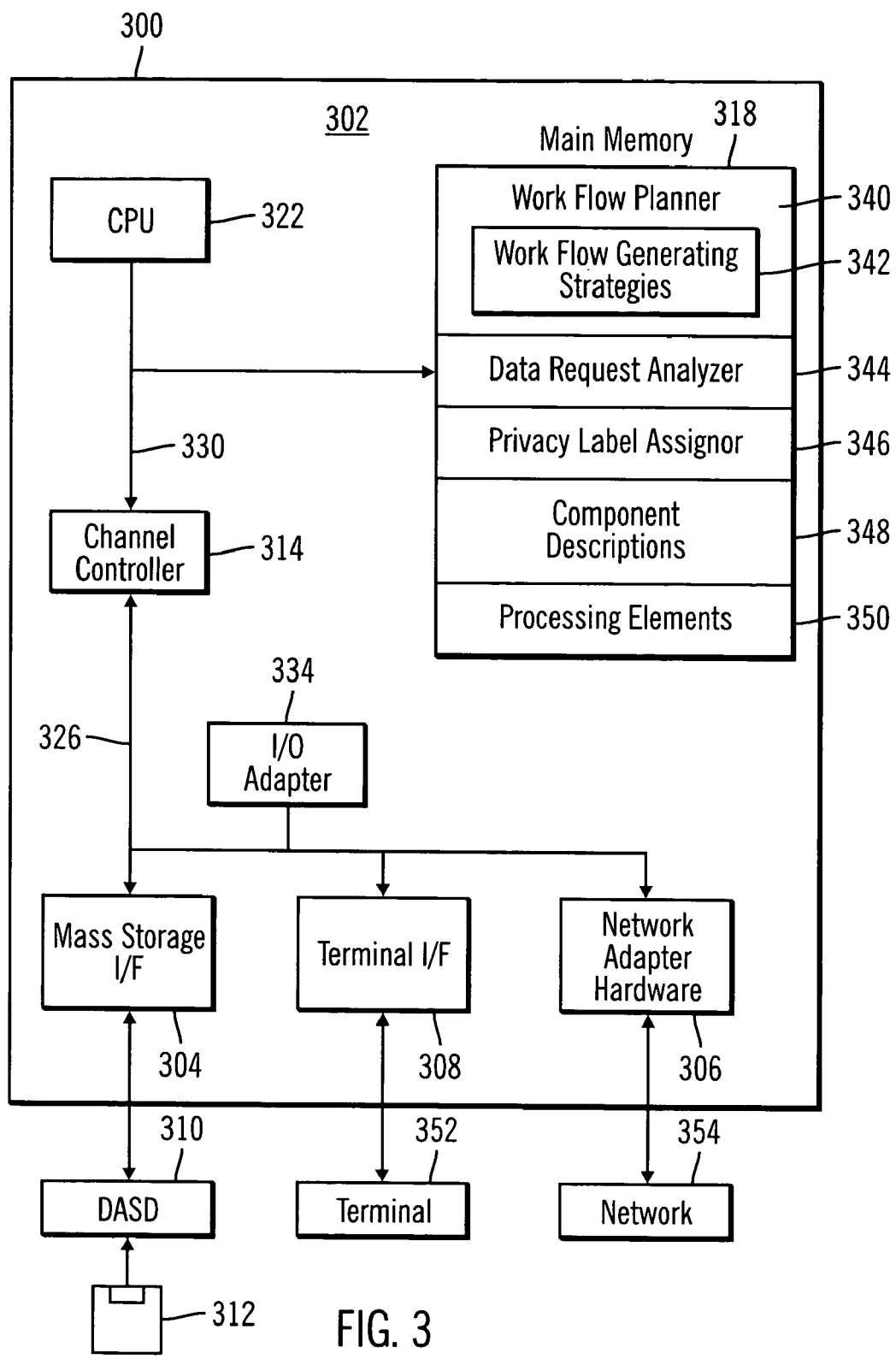
FIG. 3 is a detailed view of an information processing system according to one embodiment of the present invention.

FIG. 3 is a block diagram illustrating a detailed view of an information processing system 300 according to an exemplary embodiment of the present invention. The information processing system 300, in this embodiment, is a processing node or is a remote server communicatively coupled to the stream processing system 200. The information processing system 300 is based upon a suitably configured processing system adapted to implement an embodiment of the present invention. Any suitably configured processing system is similarly able to be used as the information processing system 300 by further embodiments of the present invention (for example, a personal computer, workstation, or the like). The information processing system 300 includes a computer 302. The computer 302 has a processor 322 that is connected to the main memory 318 and a channel controller 314 via the system bus 330. The computer 302 also includes a mass storage interface 304, terminal interface 308, I/O adapter 334, and network adapter hardware 306. An input/output bus 326 connects these components The mass storage interface 304 is used to connect mass storage devices such as data storage device 310 to the information processing system 300. One specific type of data storage device is a computer readable medium such as a floppy disk drive, which may be used to store data to and read data from a floppy diskette 312 or CD. Another type of data storage device is a data storage device configured to support, for example, NTFS type file system operations.

The main memory 318 comprises component descriptions 348. Although FIG. 3 shows the component descriptions 348 residing in the main memory 318, in another embodiment, the descriptions 348 reside within a local or remote database. A component, for example, is an input channel 402 (FIG. 4), an output channel 404 (FIG. 4), a processing element 350, or the like. An input channel 402, in one embodiment, can be a primal data stream 406 (FIG. 4) which originates outside of the stream processing system 200. An input channel 402 can also originate within the stream processing system 200 and carry data such as a document to a processing element 350. A processing element 350, in this embodiment, is a computing process, an application, a business, a manned workstation, a factory machine, an agent, a service, a component, or the like.

Although processing elements 350 are shown residing in the main memory 318, one or more processing elements that are to be used in the stream processing system 200 can reside on the processing nodes 202 and 204 or at locations remote from the information processing system 300. For example, a processing element 350 can reside on a computer in a laboratory or can be a device such as a microscope that is communicatively coupled to the stream processing system 200.

Component descriptions 348, in this embodiment, are formal descriptions of the respective component. A formal description of an input channel 402, in this embodiment, includes all information known about the channel 402 that can be used in matching the channel 402 to the inputs of processing elements 350. For example, a description of the channel 402 can include the type of data available from the channel 402, such as video, audio, text, or the like. The description can also include the format and representation of the data, such as MPEG4 or MP3 encoding for video or audio data, respectively. If the channel 402 carries structured data, such as tuples of typed attributes, the channel schema (which is comprised of the types and names of these attributes) can be included in the description of the channel 402. It should be noted that a description for a channel 402 may include various other characteristics of the channel 402 such as data rate, quality metrics, reliability and availability information, and the like. For privacy planning, this description, in this embodiment, also includes privacy information, such as a list of categories of private information that arrives or can potentially arrive in the future through the channel 402.

A formal description of a processing element 350, in this embodiment, includes the descriptions of input 408 (FIG. 4) and output 410 (FIG. 4) ports, as well as the description of the processing element 350 itself. For example, algorithms used in implementing the processing element 350, information about required resources, and the like are included in the description of the processing element 350. In this embodiment, the description of the input ports 408 includes constraints on input streams 412 (FIG. 4) (originating at the input channels 402 or from an output port 410 of another processing element) that can be connected to the input port 408. These constraints, in this embodiment, are evaluated based on the description of the connected stream(s) 412, and can include input type requirements, format requirements, data rate requirements, and other requirements.

A description of an output port 410, in this exemplary embodiment, provides the information necessary for computing the description of the data stream 414 (FIG. 4) originating at the corresponding output port 410. During workflow planning, as the workflow is composed by connecting processing elements 350 via streams 412 and 414. The description of a data stream 414 originating at an output port 410 of a processing element 350 is created, in this embodiment, based on the description of the data streams 412 connected to the input ports 408 of the same processing element 350. It should be noted that the description can also be based on other configuration parameters chosen for the processing element 350. The output port description specifies, for example, the format of the data stream 414 originating at the output port 410. The description, in this embodiment, also specifies how a privacy label assigned to the output stream 414 is created. Privacy labels associated with input streams, output streams, and processing elements can be stored in a database or memory residing at the information processing system 300 or at remote systems.

In this embodiment, the privacy label associated with the output port 410 depends on the description of the port 410 as well as on privacy labels associated with the data streams 412 connected to the input ports of the processing element 350. A privacy model instructs how the privacy labels of incoming data streams affect the privacy label of the output port. For example, a conservative privacy model, in this embodiment, takes the union of all categories of private information that arrives at input ports 408, and assigns this union as the set of categories assigned to the output stream 414. If a processing element 350 adds categories of information, these categories can be included in the set of categories assigned to the output stream 414. In this embodiment, if the processing element 350 removes categories from an information set, these categories are also removed from the categories assigned to the output stream 414. For example, a processing element 350 can send input documents to the output while removing phone numbers from these documents. In this example, the output set of categories is the same as the input set, with the exception of the phone number category being removed. The process of assigning privacy labels is discussed in greater detail below.

Figure 4:
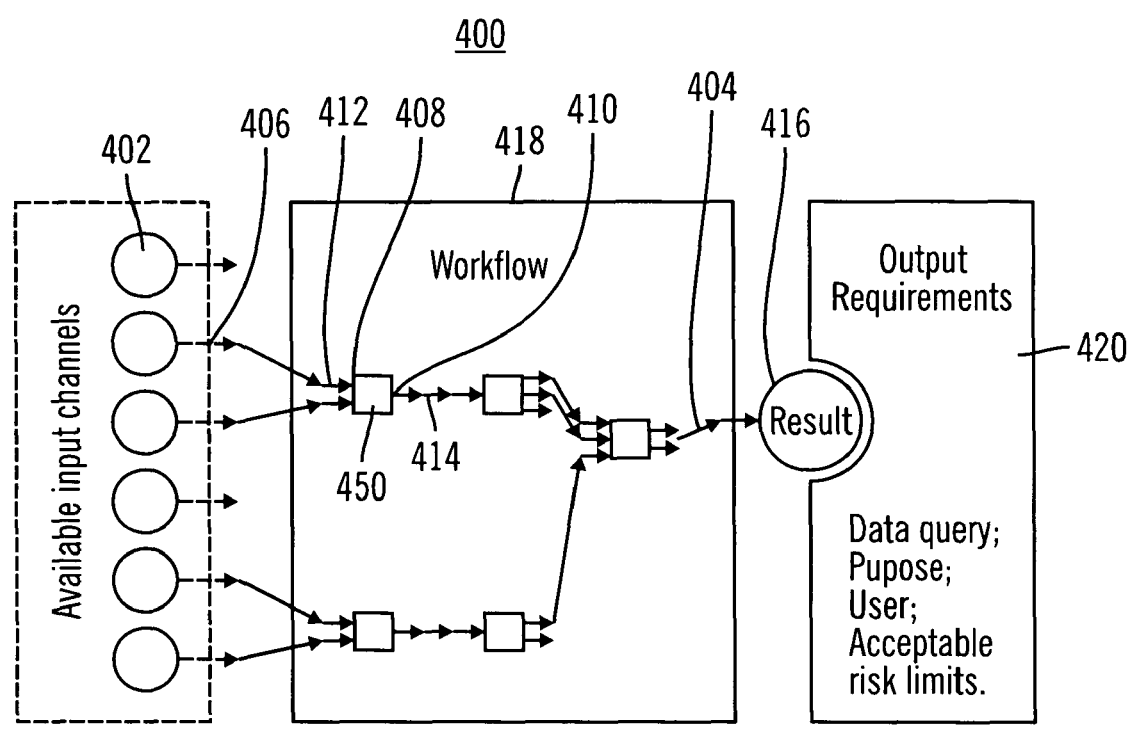
FIG. 4 is a compositional block diagram illustrating the components of a stream processing system according to one embodiment of the present invention

A privacy model controls the protection of private information when generating an output product 416 (FIG. 4). In this exemplary embodiment, the privacy model determines whether or not categories are used to label data streams. The privacy model, in this embodiment, is defined by a user (for example, an administrator or end user) or can be automatically selected by the stream processing system 200. For example, based on the type of information requested, the stream processing system 200 selects a privacy model that protects particular types of data according to privacy laws, an organization's internal policies, and the like. In another embodiment, a repository for privacy models resides at the information processing system 300 or at a remote system.

The main memory 318 also includes a data request analyzer 344. The data request analyzer 344 analyzes a user's request for an output product 416. The data request analyzer 344 identifies information included in the request that can be used for planning a workflow. The request submitted by the end user, in this embodiment, describes the desired effects of executing a particular workflow. The request also describes various constraints and preferences that are to be taken into account by the workflow planner 340 when creating workflow strategies 342 or determining alternative workflow strategies 342. The workflow planner 340 and workflow generating strategies 342 are also included in the main memory 318. In this embodiment, at least a portion of the request, is specified similar to the specification of the input ports 408 of the processing element 350, including data type, format, and the like.

For example, a user can request notification about changes in stock price based on information arriving through the input channels 402. In this example, the workflow planner 340 constructs a workflow strategy 342 that satisfies this request and chooses the best alternative among possible alternatives, such as obtaining information from radio transmissions, TV news, financial data providers, and the like.

The request, in this embodiment, also includes privacy-related information about the user, such as user role, purpose of access, and the like. In this embodiment, this information is translated into constraints on data stream privacy labels associated with the output streams 414 or other effects of the workflow. The constraints are expressed in a format that is understood and evaluated by the workflow planner 340. For example, purpose of access "treatment" and role "physician" can be mapped into a constraint that allows the creation of output streams that include a category "medical records" but does not allow a category of "employment records". The constraint is then represented as an "allow" and "exclude" list of categories. In another embodiment, the privacy-related information is added to the user's request automatically by the stream processing system 200 without the user's involvement.

The workflow generating strategies 342 are used by the stream processing system 200 to execute a workflow 418 (FIG. 4). The workflow 418 results in output streams that satisfy the constraints of a user request, privacy considerations, and the like. In this embodiment, the workflow planner 340 creates a workflow plan/strategy 342 by representing component descriptions 348, privacy parameters associated with the user, and the like as a planning task description. The planning task description is represented in a format that is recognized by an automatic planner such as the Metric-FF planner, which is further described in Hoffmann, "*The Metric-FF Planning System: Translating 'Ignoring Delete Lists' to Numeric State Variables*", Journal of AI Research, 2003, vol. 20, pages 291-341, which is hereby incorporated herein by reference in its entirety. Another planner that can be used is the SPPL planner, which is further described in A. Riabov, et al., "*Planning for Stream Processing Systems*", in Proceedings of AAAI-05, which is hereby incorporated herein by reference in its entirety. It should be noted that the present invention is not limited to these planners.

A planning task, in this exemplary embodiment, is described as a set of actions with preconditions and effects, as well as the description of initial and goal states. Various different methods can be used for mapping the component descriptions 348 and request descriptions such as the privacy parameters associated with the requesting user into the planning task. For example, in this embodiment, each processing element 350 is mapped to an action. Input channels 402 are also mapped to actions or to an initial state depending on whether using a channel 402 incurs a cost. For example, depending on the degree of privacy risk that results from using the processing element 350, a cost factor is associated with the processing element 350. The higher the privacy risk, the higher the cost factor. The goals are also mapped to the description of desired results requested by the end user, and to the set of privacy-related information attributes that can be accessed by the user.

The workflow planner 340 automatically produces a plan or a set of plans (strategies 342) that are represented as a sequence or a graph of actions. Each plan is then translated into a format that is recognized and can be deployed by the operating environment (stream processing system). A more detailed description of the planning processes is given in the commonly owned U.S. patent application Ser. No. 11/361,877, filed Feb. 24, 2006, which is entitled "System and Method of Stream Processing Workflow Composition Using Automatic Planning", and in A. Riabov, et al., "*Planning for Stream Processing Systems*", in Proceedings of AAAI-05, both of which are incorporated herein by reference in their entirety.

The plans are represented in a format recognized by the operating environment (steam processing system) and submitted for deployment. Deploying a plan can produce the effects requested by the user immediately or with a delay. One example of the operating environment (stream processing system) is a distributed operating system that deploys and/or configures software components. Web services may present one example of such an environment, where components and input channels are the web services, the streams correspond to information flows between web services, and the results description describes the goal that must be achieved by the web services, such as travel planning.

The workflow planner 340, in this embodiment, also dynamically modifies the workflow strategies 342 (plans) or creates new strategies 342 in response to a changing environment. For example, it is possible that during execution of a workflow 418, the set of component descriptions 348 including channel descriptions changes. In many instances, the workflow 418 may no longer satisfy the planning request. In this case, the same request can be supplied for planning again (i.e., re-planning), potentially resulting in construction and deployment of a different workflow 418 for performing the same request. This re-planning step may be triggered automatically when the changes are detected. Alternatively, users may initiate re-planning themselves by changing their requests, or requesting re-planning of unchanged requests.

The main memory 318 also includes a privacy label assignor 346, which assigns privacy labels to the components of the stream processing system based at least in part on the component descriptions 348. For example, in this exemplary embodiment, each document or data stream that is produced within the system 200 and/or received through an input channel 402 is annotated with a privacy label. In this embodiment, the privacy policy model for generating workflows can be based on a MAC model for workflows. In another embodiment, the privacy policy selected for the stream processing system allows a data annotation model similar to the MLS model used for access control in which information categories are chosen that correspond to smaller subsets of objects or object attributes according to privacy sensitivity of the data. MLS is further described in the following references: D. Bell, et al., *"Computer security model: Unified exposition and Multics interpretation"*, Technical Report ESD-TR-75-306, The MITRE Corporation, Bedford, Mass., HQ Electronic Systems Division, Hanscom AFB, MA, June 1975, and in *Multilevel Security in the Department Of Defense: The Basics*" available from National Security Institute website, http://nsi.org/Library/Compsec/sec0.html, which are hereby incorporated herein by reference in their entirety. MLS is currently implemented, for example, in the IBM® zSeries of servers. It should be noted that any data annotation model can be used within the scope of the present invention.

In this embodiment, the privacy label combined with purpose of access and user information is used to determine the privacy risk of disclosing this information to a user for a particular purpose. For example, the workflow planner 340 uses the privacy label in conjunction with the user role and purpose of access parameters to determine a workflow strategy 342 that is below a predefined threshold for privacy risk. The workflow planner 340 estimates the privacy risk based on the privacy model chosen. Additionally, the privacy label of each document or data stream produced by a processing element 35, e.g., the output 414 of a processing element 350, is computed as a function of the labels corresponding to the entities supplied as input 412 to the processing element 350. This function, in this embodiment, is specified in the formal description 348 of the processing element 350 provided to the workflow planner 340. The value is independent of any parameters other then the value of input labels for each input 412, parameters taken from component description 348, and parameters specified in the privacy policy. The formal description of each processing element 350 can also specify a condition on the privacy label of inputs, restricting the set of data to which the processing element 350 can be applied.

In this exemplary embodiment, the privacy model is translated into planning problem as follows. The transformations of privacy labels are expressed as action effects corresponding to the addition of a processing element 350 in the workflow. The privacy labels of input channels 402 are expressed as effects of using primal streams 406 in the composition. The privacy label requirements are specified as action preconditions, and the limits on privacy risk are defined in a goal specification. Additionally, other preconditions, effects, goals, and initial conditions, in this embodiment, are specified to ensure that data produced by the workflow provides valid data that answers the query requirements given by the end user. This construction allows the use of planning for automatic workflow composition, producing workflows that produce the required output and minimize or manage privacy risks according to a user-defined privacy policy.

Although illustrated as concurrently resident in the main memory 318, it is clear that respective components of the main memory 318 are not required to be completely resident in the main memory 318 at all times or even at the same time. In this embodiment, the information processing system 300 utilizes conventional virtual addressing mechanisms to allow programs to behave as if they have access to a large, single storage entity, referred to as a "computer system memory", instead of access to multiple, smaller storage entities such as the main memory 318 and data storage device 310.

Although only one CPU 322 is illustrated for computer 302, computer systems with multiple CPUs can be used equally effectively. Preferred embodiments of the present invention further incorporate interfaces that each includes separate, fully programmed microprocessors that are used to off-load processing from the CPU 322. Terminal interface 308 is used to directly connect one or more terminals 352 to computer 302 to provide a user interface to the computer 302. These terminals 352, which are able to be non-intelligent or fully programmable workstations, are used to allow system administrators and users to communicate with the information processing system 300. The terminal 352 is also able to be a of user interface and peripheral devices that are connected to computer 402 and controlled by terminal interface hardware included in the terminal I/F 308 that includes video adapters and interfaces for keyboards, pointing devices, and the like.

An operating system 210 (FIG. 2) included in the main memory is a suitable multitasking operating system such as the Linux, UNIX, Windows XP, or Windows Server 2003 operating system. Embodiments of the present invention are able to use any other suitable operating system. Some embodiments of the present invention utilize architectures, such as an object oriented framework mechanism; that allows instructions of the components of the operating system to be executed on any processor located within the information processing system 300. The network adapter hardware 306 is used to provide an interface to the network 354. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g., floppy disk 410, CD ROM, or other form of recordable media, or via any type of electronic transmission mechanism.

One of the advantages of the present invention is that privacy risks in networks of processing components (or workflows) are managed and mitigated by automatically using planning techniques based on descriptions of the components and data. The required output data are produced by the network and the overall privacy risk is minimized or kept below a predefined value (budget). A similar method can also be used to modify existing networks (workflows) to reduce the overall privacy risk. For example, the workflow can be modified to include the operations of suppression, anonymization, or pseudonymization of PII before the information is presented to the employees or third parties; this modification can lower the privacy risks associated with such information disclosures.

The advantages of managing and mitigating privacy risks automatically, compared to the existing manual or single-level security methods, include improved speed of the analysis, quality, and precision of the risk estimation, and greater flexibility that enables processing of entities of multiple security levels. All of these improvements contribute to the improved quality of the resulting data produced by the system. In addition, automatic methods make it possible to construct verifiably secure large-scale systems that are composed of hundreds, or even thousands of components, which cannot practically be done manually by analysts.

The present invention is also advantageous because it provides a "self-healing" property. In other words, the stream processing system of the present invention dynamically modifies (reconfigures) a workflow when a change in the environment occurs so that potentially valuable sensory, data is not lost.

Exemplary Composition of a Workflow

FIG. 4 shows an exemplary compositional diagram 400 illustrating the components of a stream processing system according to an embodiment of the present invention. The processing graph 400 shows a deployment of a particular workflow 418 in the stream processing system 200 for creating a particular result 416. A workflow 418 is comprised of a network of processing elements 450 interconnected by one or more data streams 412 and 414. One or more available input channels 402 provides a primal data stream 406 to one or more processing elements 450. Each processing element has at least one input port 408 and at least one output port 410. An output channel 404 provides the result 416 to the end user. The result 416 satisfies the output requirements 420 such as acceptable risk limits and the privacy parameters of user role and purpose of access.

The workflow 418 is created by interconnecting the processing elements 450, based on the information about the processing elements 450, input channels 402, and output requirements 420. The result 416, produced by the composition, matches the product requirements 420. The composition comprises the selection of processing elements 350 and primal entities 402, and of interconnections between them.

The stream processing system 200 of the present invention uses planning techniques to comprise the workflow 418 in such a way that privacy risks are below a predefined threshold or are at least reduced. To apply planning algorithms to a stream processing system 200 comprising the components as illustrated in FIG. 4, the initial state, the goal state, and the conditions for applying each of the possible operators to this state are described as logical predicates. The effects, i.e., the changes to the predicate values for each operator, are also described as logical predicates. In this embodiment, the state of the world is described by the set of available documents, and each operator corresponds to applying a processing component to produce new documents. The precondition for using a processing element 450 is the availability of all the documents that constitute the required input according to the formal description of the element 450. The effects of applying a processing element 450 are those of making the produced documents available for retrieval through the output channels 404 or for further processing. The goal state is described as a set of documents that comprise the output. The documents in this example can also be replaced with streams of sensory data. Privacy considerations such as the privacy risk incurred by selecting a processing element or using a data stream are also taken into account when planning a workflow strategy 342.

Exemplary Notation for Workflow Planning when Mitigating and Managing Privacy Risks Solely for purposes of illustration, an exemplary instance of the planning problem with managed privacy risk will now be described. Consider that all edges in a workflow 418 (e.g., data streams) are assigned unique names, and each processing element 350 and 450 can be described as a transformation S: $(N_{in}, T_{in}) \rightarrow (N_{out}, T_{out})$ where S is the identifying name of the processing element $N_{in}$ is the name of the data stream 406 or 414 consumed by the processing element $N_{out}$ is the name of the data stream produced by the processing element $T_{in}$ is an integer between 1 and 5, corresponding to the privacy label of the processing element and $T_{out}$ is the privacy label requirement assigned to the produced data stream $N_{out}$. If $T_{out}$ is specified as * (i.e., a star), then the "write" label of the component is equal to the "read" label of the component (which can be less or equal to Tin), and the output privacy label assigned to the produced data stream is equal to the actual privacy label of the consumed data stream (which can be less or equal to $T_{in}$). In other words, for components that specify $T_{out}=*$ the output label is computed automatically based on input, and these processing elements do not need to be trusted to remove any privacy-sensitive information and therefore to change privacy labels.

Solely for the sake of simplicity, it is assumed that each processing element accepts a single data stream and produces a single data stream. Further, although not so limited, it is assumed that trust levels are specified by numbers. It should be appreciated, however, that any number of data streams with complex properties can be consumed and produced by processing elements (e.g., in web services composition applications), and any trust specification can be used, as long as partial order between the trust levels can be defined. For example, a privacy-category set combination from an MLS model can be used to describe trust levels.

Consider, for example, four entities named A, B, C and D. Privacy labels comprise a single number. Privacy levels are defined similarly to a privacy level in the MLS model. Assume the following about processing elements S1, S2, S3 and S4:

S1: (A,3)→(B,*)
S2: (B,3)→(C,2)
S3: (C,3)→(D,*)
S4: (B,3)→(D,*)

Processing element S1 expects on input the data stream A with a privacy level of at most 3. Processing elements S2 and S4 expect on input the data stream B, and processing element S3 expects on input the data stream C. Stations S2, S3 and S4 each expect a privacy level of at most 3. Processing element S1 produces data stream B with a privacy level that is determined by the default rule (i.e., the * rule). Processing element S2 produces data stream C, and processing elements S3 and S4 produce data stream D. Under the default rule, the privacy level of an output is the maximum of input privacy levels. As shown above, every processing element except for processing element S2 follows the default rule. In contrast, processing element S2 changes the privacy level of the output to 2, if the input level is above 2.

Further assume that A is a primal data stream of privacy label 3, and that no other primal data streams exist. Also assume that data stream D is required to be produced for the consumer with a privacy label 2. It should be noted that S2 is a special-purpose processing element, and in practice such an element will preferably require a review to certify that it is allowed to reduce privacy label requirements.

As described above in general terms, the problem of constructing a network of processing element 350 and 450 can be described for AI planning algorithms using actions and predicates. However, in this simple example all networks of processing elements having a particular configuration can be examined. A network is examinable if the input of the processing element is linked to the primal or derived data stream of corresponding type $N_{in}$, and the label of the input data stream is dominated by the subject label of the processing element $T_{in}$. By considering all possible combinations of processing elements and their interconnections (i.e., an exhaustive search method), the workflow planner 340 detects that there are two possible sequences of processing elements that produce data stream D, the sequences {S1→S4} and {S1→S2→S3}. However the network {S1→S4} produces data stream D with privacy label 3, and {S1→S2→S3} produces data stream D with privacy label 2, because the special-purpose operation S2 has been applied to filter our valuable content during processing. Since the consumer's privacy label is 2, the workflow planner 340 returns the network {S1→S2→S3}, which minimizes the privacy risk. The workflow planner 340 can also return a list of plans (workflow strategies) to produce D. The plans may be ordered in increasing privacy labels, which implies increasing privacy risks.

An Example of Using Planning for Privacy Planning

The following is an illustrative example of using planning techniques for minimizing privacy risks. Assume a marketing research department of a multinational company requests automated analysis of conversations in chat rooms. The chat rooms are hosted by the company for the purpose of collecting opinions (praise/critique) about the company's products. The analysis is performed by a compositional stream processing system 200. A privacy policy of the company dictates that data entered by minors cannot be analyzed or stored for any purpose. The privacy policy also states that chat room conversations may be stored and analyzed for research purposes, as long as the conversations are not associated with the names of the persons participating, and unless customers opt-out, specifically requesting that their conversations be excluded.

In one embodiment, the following attributes are used to describe privacy-sensitive information in the labels: Chat, Minor, ID and OptOut. Chat is assigned to any data stream carrying information derived from chat conversations. Minor denotes data streams that contain any data entered by minors. ID is assigned to data streams that contain a unique identifier that can be used to identify the customer in the customer database, which includes the customer's name. OptOut denotes data streams that contain conversions of customers who opted out, i.e., requested that their conversations not be used for research. In one embodiment Data types are Conversation, CustomerInfo, and AnalysisReport.

The following components are available.

---

ScreenNameToID: ( {Conversation}, {Chat,Minor,OptOut,ID} ) -> ( {Conversation, CustomerInfo}, {Chat,Minor,OptOut,ID} )
SuppressMinors: ( {Conversation,CustomerInfo}, {Chat,Minor,OptOut,ID} ) -> ( {Conversation, CustomerInfo}, {Chat,OptOut,ID} )
SuppressOptOut: ( {Conversation,CustomerInfo}, {Chat,OptOut,ID} ) -> ( {Conversation, CustomerInfo}, {Chat,ID} )
SuppressID: ( {Conversation}, {Chat,ID} ) -> ( {Conversation}, {Chat} )
AnalyzeChat: ( {Conversation}, {Chat,Minor,OptOut,ID} ) -> ( {AnalysisReport}, * )

---

The state of the data stream (type and privacy label) can be represented as world state in planning domain description language (PDDL), and a planner can be called to find a workflow producing AnalysisReport. The PDDL language is further described in M. Ghallab, et al., "PDDL. The planning domain definition language.", Yale Center for Computational Vision and Control, 1998, DCS TR-1165, which is hereby incorporated herein by reference in its entirety. PDDL is a de-facto standard formulation for planning problems.

In this embodiment, if the output label is not restricted by privacy policy, the workflow planner 340 finds a short solution of 1 action [AnalyzeChat]. However, if the output label is restricted to {Chat}, the workflow planner 340 constructs a longer solution complying with the policy: [ScreenNameToID->SuppressMinors->SuppressOptOut->SuppressID->AnalyzeChat].

Below is an exemplary PDDL representation and planner output. The workflow planner 340 used in this example is Metric-FF, which is further described in J. Hoffmann, "The Metric-FF Planning System: Translating 'Ignoring Delete Lists' to Numeric State Variables", Journal of AI Research, 2003, vol. 20, pages 291-341, which is hereby incorporated herein by reference in its entirety.

---

```
;; [Domain file domain.pddl]
(define (domain MarketingDomain)
   (:predicates (Conversation)
         (CustomerInfo) (AnalysisReport)
         (NoChat) (NoMinor) (NoID) (NoOptOut)
   )
   (:action ScreenNameToID
      :precondition ( and
          (Conversation)
      )
      :effect ( and
          (Conversation) (CustomerInfo)
          (not (NoID) ) )
   )
   (:action SuppressMinors
      :precondition( and (Conversation) (CustomerInfo)
   )
      :effect( and (Conversation) (CustomerInfo)
   (NoMinor) )
   )
   (:action SuppressOptOut
      :precondition( and (Conversation) (CustomerInfo)
   )
      :effect( and (Conversation) (CustomerInfo)
   (NoOptOut) )
   )
   (:action SuppressID
      :precondition( and (Conversation) (CustomerInfo)
   )
      :effect( and (Conversation) (not (CustomerInfo))
   (NoID) )
   )
   (:action AnalyzeChat
      :precondition( and (Conversation) )
      :effect( and (AnalysisReport) (not Conversation)
   )
   )
)
;;[Problem file problem.pddl]
(define (problem MarketingProblem)
   (:domain MarketingDomain)
   (:init (Conversation) (NoID) )
   (:goal (and (AnalysisReport) ))
)
[Output of Metric-FF planner with the above problem
and domain files:]
$ ff -f problem.pddl -o domain.pddl
ff: parsing domain file
domain 'MARKETINGDOMAIN' defined
 . . . done.
ff: parsing problem file
problem 'MARKETINGPROBLEM' defined
 . . . done.
no metric specified. plan length assumed.
checking for cyclic := effects --- OK.
ff: search configuration is EHC, if that fails then
best-first on 1*g(s) + 5*h(
s) where
      metric is plan length
Cueing down from goal distance:      1 into depth [1]
                                     0
```

-continued

```
ff: found legal plan as follows
step       0: ANALYZECHAT
time spent:        0.10 seconds instantiating 5 easy, 0
hard action templates
                   0.00 seconds reachability analysis,
yielding 6 facts and 5 actions
                   0.00 seconds creating final
representation with 5 relevant facts,
   0 relevant fluents
                   0.00 seconds computing LNF
                   0.00 seconds building connectivity
graph
                   0.00 seconds searching, evaluating 2
states, to a max depth of 1
                   0.10 seconds total time
;;[ Now adjust the policy in problem.pddl file,
enforcing the output to be dominated by access label
assigned to marketing department]
(define (problem MarketingProblem)
    (:domain MarketingDomain)
    (:init (Conversation) (NoID) )
    (:goal (and (AnalysisReport) (NoID) (NoMinor)
(NoOptOut) ))
)
[ Output of Metric-FF with the modified problem file:
]
$ ff -f problem.pddl -o domain.pddl
ff: parsing domain file
domain 'MARKETINGDOMAIN' defined
... done.
ff: parsing problem file
problem 'MARKETINGPROBLEM' defined
... done.
no metric specified. plan length assumed.
checking for cyclic := effects --- OK.
ff: search configuration is EHC, if that fails then
best-first on 1*g(s) + 5*h(
s) where
    metric is plan length
Cueing down from goal distance:    4 into depth
[1] [2]
                                   3        [1]
                                   2        [1]
                                   1        [1]
                                   0
ff: found legal plan as follows
step       0: SCREENNAMETOID
           1: SUPPRESSMINORS
           2: SUPPRESSOPTOUT
           3: SUPPRESSID
           4: ANALYZECHAT
time spent:        0.00 seconds instantiating 5 easy, 0
hard action templates
                   0.00 seconds reachability analysis,
yielding 6 facts and 5 actions
                   0.00 seconds creating final
representation with 6 relevant facts,
   0 relevant fluents
                   0.00 seconds computing LNF
                   0.00 seconds building connectivity
graph
                   0.00 seconds searching, evaluating 11
states, to a max depth of 2
                   0.00 seconds total time
```

Exemplary Process for Constructing and Deploying a Workflow

Figure 5:
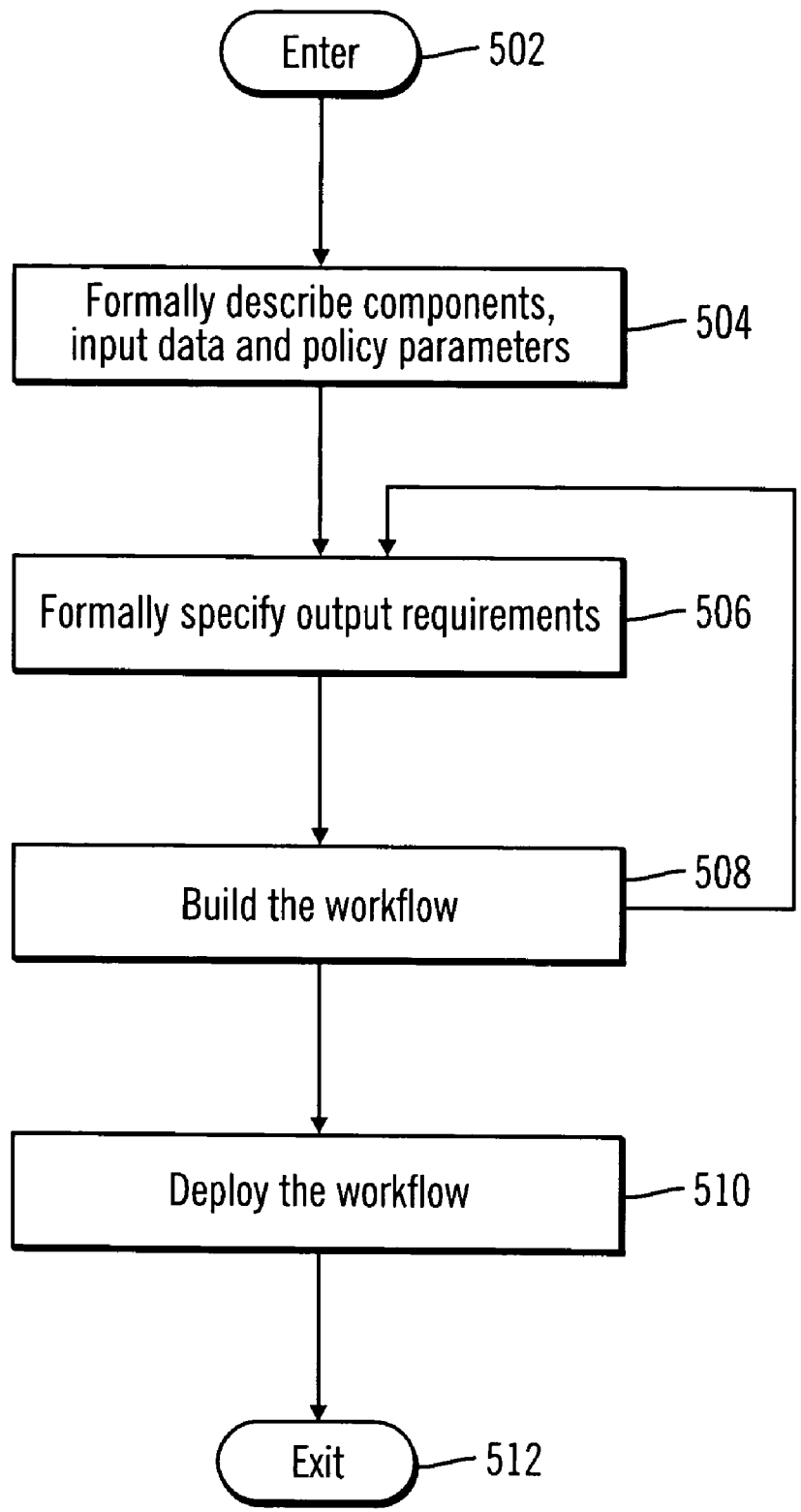
FIG. 5 is an operational flow diagram illustrating a process of constructing and deploying a workflow according to an exemplary embodiment of the present invention.

FIG. 5 illustrates an exemplary process of constructing and deploying a workflow according to an embodiment of the present invention. The operational flow diagram of FIG. 5 begins at step 502 and flows directly to step 504. The stream processing system 200, at step 504, creates formal descriptions for each of the available processing elements 350 and each primal data input channel 402. The formal descriptions can be entered into a database or a knowledge base computer system for simplified search and management of the data. The formal descriptions, in this embodiment, include privacy properties, as well as properties specific to describing the content of entities and the functionality of the processing elements 350.

A user, at step 506, constructs a formal description of the requirements describing the results, or the desired outcome, of the processing. The description of user requirements, in this embodiment, includes a definition of the maximum-accepted privacy risk level. This level may be fixed by a system-wide privacy policy, or chosen by the user from the range allowed by the policy. After the descriptions of processing elements, primal entities, and user requirements become available, processing elements 350, at step 508, are selected and a network of interconnections between the processing elements is created. The network of processing elements is created by matching the output of one processing element (or a primal input data stream 406) to the input 408 of another processing element. Final outputs that contain the product are also specified. The network, at step 510, is implemented (i.e., deployed) and used in a real production system. It should be appreciated that steps 506 and 508 can be repeated several times, constructing alternate compositions (i.e., networks) of processing elements that satisfy different objectives. The control flow then exits are step 512.

Exemplary Process of Assigning Privacy Labels

Figure 6:
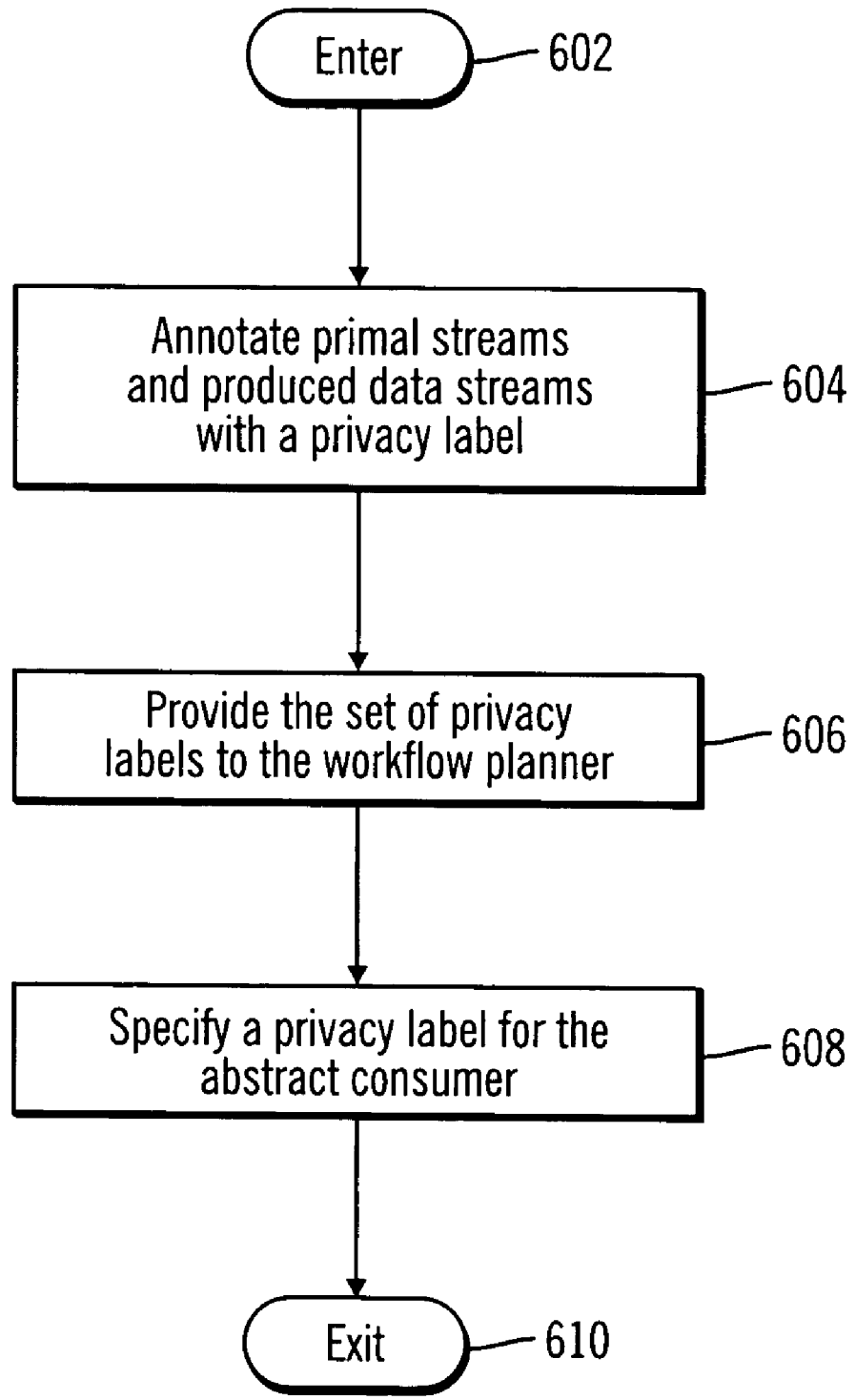
FIG. 6 is an operational flow diagram illustrating a process for assigning privacy labels to components of a stream processing system according the exemplary embodiment of the present invention.

FIG. 6 illustrates an exemplary process of assigning privacy labels to components of a stream processing system 200 according to an embodiment of the present invention. The operational flow diagram of FIG. 6 begins at step 602 and flows directly to step 604. The privacy label assignor 346, at step 604, annotates each data stream 414 produced within the network of processing elements 350 and each primal data stream 406 used in the stream processing system 200 is annotated with a privacy label. The privacy label, in this embodiment, specifies which processing elements 350 can receive the data stream 406, 414.

During planning, the privacy label of each data stream produced by a processing element 350 is computed as a function of the privacy labels corresponding to the data streams 414 supplied as an input to that processing element 350. In this embodiment the privacy label of each data stream produced by a processing element 350 is computed by one of two alternative methods. For example, the privacy label of the data streams produced by the processing element 350 is the union of privacy labels of the input data streams. The union of the privacy labels is a minimal privacy label that dominates every privacy label in the set.

Alternatively, a processing element 350 can be certified to assign to the output data streams privacy labels that are lower than those computed in process described above. This certified processing element is referred to as a "special-purpose processing element". In this exemplary embodiment, the assignment of privacy labels to data streams produced by a processing element 350 is expressed as the effects of an action corresponding to a processing element 350. The privacy labels of primal data streams are expressed, in one embodiment, as effects of including primal data streams in the network of processing elements. The privacy label requirements are specified, in this embodiment, as preconditions, and requirements are specified as a goal specification. In one embodiment, the privacy labels are computed according to MLS rules.

The set of privacy labels of the primal data streams, at step 606, are provided to the workflow planner 340. A subject privacy label can be specified for each of the processing elements 350. If a subject privacy label is not specified, the maximum privacy label, i.e., the label allowing all access, is assumed. A privacy label, at step 608, is specified for the abstract consumer (i.e., a type of subject) of the final product; any data stream 414 produced by the network of processing elements, in this embodiment, requires a privacy label dominated by that of the consumer.

If the workflow planner 340 finds a workflow plan/strategy 342 that satisfies all of the preconditions and the goal specification, the MLS privacy policy is enforced. Using the encoding of the planning problem and the privacy policy described in greater detail above, planning methods can be used for automatically creating networks of primal data streams and processing elements. Such networks produce the required output while minimizing privacy risks. The control flow exits at step 610.

The present invention as would be known to one of ordinary skill in the art could be produced in hardware or software, or in a combination of hardware and software. However in one embodiment the present invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions, or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A computer-implemented method for managing and mitigating privacy risks in a system comprising a network of processing elements, the method comprising the steps of:
   receiving a request for at least one output product from the system, the request including a set of privacy parameters;
   in response to receiving the request, analyzing a set of processing component descriptions associated with a plurality of processing components in the system, the set of processing component descriptions describing a set of attributes associated with the processing components;
   creating, based at least on the set of privacy parameters and the set of processing component descriptions, at least one set of workflow generating strategies that results in the output product having a privacy risk value below a predefined threshold, the at least one set of workflow generating strategies indicating how to configure a set of the processing components together to provide the output product with the privacy risk value below the predefined threshold; and
   deploying at least one of the workflow generating strategies for automatically producing the at least one output product.

2. The method of claim 1, wherein the system is a stream processing system.

3. The method of claim 1, wherein each of the workflow generating strategies reduces privacy risk based at least in part on the set of privacy parameters.

4. The method of claim 1, wherein the set of privacy parameters include a user identifier and a purpose of access for limiting information provided in the output product.

5. The method of claim 1, wherein the set of privacy parameters are included in the request by manual insertion by a user requesting the output product.

6. The method of claim 1, wherein the set of privacy parameters are inserted into the request automatically by the system.

7. The method of claim 1, further comprising the step of:
   dynamically modifying at least one of the workflow generating strategies based on a detected change in at least one of a primal data stream and a processing element.

8. The method of claim 1, wherein the creating step comprises:
   selecting a set of processing elements,
   wherein an output port of each processing element coupled to an adjacent processing element provides an input to the adjacent processing element that is compatible with a privacy constraint associated with the adjacent processing element, and
   a privacy risk value associated with each instance of providing an input to an adjacent processing element is below a predefined threshold.

9. The method of claim 1, wherein the creating step comprises:
   assigning a first privacy label associated with at least one primal data stream and a second privacy label associated with at least one processing element based on at least one privacy model,
   wherein each of the workflow generating strategies is based at least in part on the set of privacy parameters, the first privacy label, and the second privacy label.

10. The method of claim 9, wherein the privacy label associated with the processing element includes a privacy constraint associated with an input port of the processing element and a set of privacy properties associated with an output port of the processing element.

11. The method of claim 10, wherein the privacy constraint controls the type of input data stream allowed to be processed by the processing element.

12. The method of claim 9, wherein the privacy label associated with the at least one primal data stream includes a list of private information categories associated with the primal data stream.

13. A system for managing and mitigating privacy risks, the system comprising:
   a memory;
   a processor communicatively coupled to the memory;
   a receiver for receiving a request for at least one output product from the system, the request including a set of privacy parameters;
   a workflow planner for:
      in response to receiving the request, analyzing a set of processing component descriptions associated with a plurality of processing components in the system, the set of processing component descriptions describing a set of attributes associated with the processing components; and
      creating, based at least on the set of privacy parameters and the set of processing component descriptions, at least one set of workflow generating strategies that results in the output product having a privacy risk value below a predefined threshold, the at least one set of workflow generating strategies indicating how to configure a set of the processing components together to provide the output product with the privacy risk value below the predefined threshold; and
   a workflow deployer for deploying at least one of the workflow generating strategies for automatically producing the at least one output product.

14. The system of claim 13, wherein each of the workflow generating strategies reduces privacy risk based at least in part on the set of privacy parameters.

15. The system of claim 13, wherein the workflow planner dynamically modifies at least one of the workflow generating strategies based on a detected change in at least one of a primal data stream and a processing element.

16. The system of claim 13, further comprising:
   a processing element selector for selecting a set of processing elements, wherein an output port of each processing element coupled to an adjacent processing element provides an input to the adjacent processing element that is compatible with a privacy constraint associated with the adjacent processing element, and wherein a privacy risk value associated with each instance of providing an input to an adjacent processing element is below a predefined threshold; and
   a privacy label assignor for assigning a first privacy label associated with at least one primal data stream and a second privacy label associated with at least one processing element based on at least one privacy model, wherein each of the workflow generating strategies is based at least in part on the set of privacy parameters, the first privacy label, and the second privacy label.

17. A non-transitory computer readable medium for managing and mitigating privacy risks in a system comprising a network of processing elements, the computer readable medium comprising instructions encoded thereon for:
   receiving a request for at least one output product from the system, the request including a set of privacy parameters;
   in response to receiving the request, analyzing a set of processing component descriptions associated with a plurality of processing components in the system, the set of processing component descriptions describing a set of attributes associated with the processing components;
   creating, based at least on the set of privacy parameters and the set of processing component descriptions, at least one set of workflow generating strategies that results in the output product having a privacy risk value below a predefined threshold, the at least one set of workflow generating strategies indicating how to configure a set of the processing components together to provide the output product with the privacy risk value below the predefined threshold; and
   deploying at least one of the workflow generating strategies for automatically producing the at least one output product.

18. The computer readable medium of claim 17, wherein the instructions for creating further comprise instructions for:
   selecting a set of processing elements,
   wherein an output port of each processing element coupled to an adjacent processing element provides an input to the adjacent processing element that is compatible with a privacy constraint associated with the adjacent processing element, and
   a privacy risk value associated with each instance of providing an input to an adjacent processing element is below a predefined threshold.

19. The computer readable medium of claim 17, wherein the instructions for creating further comprise instructions for:
   assigning a first privacy label associated with at least one primal data stream and a second privacy label associated with at least one processing element based on at least one privacy model,
   wherein each of the workflow generating strategies is based at least in part on the set of privacy parameters, the first privacy label, and the second privacy label.

20. The computer readable medium of claim 17, further comprising instructions for:
   dynamically modifying at least one of the workflow generating strategies based on a detected change in at least one of a primal data stream and a processing element.

* * * * *